United States Patent [19]

Tanaka et al.

[11] 4,015,107
[45] Mar. 29, 1977

[54] WEIGHTED PULSE SIGNAL COUNT SYSTEM

[75] Inventors: Shinichi Tanaka, Tenri; Kenji Sano, Osaka; Seiji Kimura, Yamatokoriyama, all of Japan

[73] Assignee: Sharp Kabushiki Kaisha, Osaka, Japan

[22] Filed: Oct. 18, 1974

[21] Appl. No.: 515,866

[30] Foreign Application Priority Data

Oct. 19, 1973 Japan .............................. 48-118035

[52] U.S. Cl. ........................ 235/61.6 R; 35/48 B; 235/92 CN; 235/168; 235/61.11 R; 235/61.12 N

[51] Int. Cl.² ................. G06K 7/10; G06K 19/06; G09B 7/00; G06F 7/385

[58] Field of Search ................. 235/61.6 D, 61.6 J, 235/61.7 B, 92 SA, 61.11 R, 61.11 D, 61.11 E, 61.6 R, 61.1, 61.6 E, 168, 92 BQ; 340/149 A, 347; 250/566, 567, 568, 569, 570; 35/48 B

[56] References Cited

UNITED STATES PATENTS

| | | | |
|---|---|---|---|
| 2,523,516 | 9/1950 | Potter | 235/92 CN |
| 3,323,527 | 6/1967 | Wu | 235/92 CN |
| 3,590,223 | 6/1971 | Cake | 235/92 BQ |
| 3,639,732 | 2/1972 | Crain | 235/61.12 N |
| 3,716,698 | 2/1973 | Simjian | 235/61.1 |
| 3,845,280 | 10/1974 | Dillon | 235/61.11 R |

*Primary Examiner*—D. W. Cook
*Assistant Examiner*—Robert M. Kilgore
*Attorney, Agent, or Firm*—Birch, Stewart, Kolasch and Birch

[57] ABSTRACT

Pulse signals of different weights are introduced from different input terminals into the present count system in a parallel fashion, respectively. Each number of the pulse signals of different weights are counted in a binary code notation. There is provided a weight information generator which generates weight signals, in a binary coded decimal notation, dependent upon the weight of the weighted pulse signals. Each of the weight signals are repeatedly added, each number of the repetition being identical with the counted number of the pulse signals of different weights introduced into the present system. A desired information may be obtained by totaling the results of these additions.

6 Claims, 4 Drawing Figures

WEIGHTED PULSE SIGNAL COUNT SYSTEM

BACKGROUND OF THE INVENTION

The present invention relates to a count system for counting and calculating weighted pulse signals. In counting and calculating weighted pulse signals, according to the prior art approach, a stream of pulses, the pulse number of which depends upon the individual weight, is generated and the total number of the pulses are counted by a counter. Implementation of a pulse generator which generates the stream of pulses, the pulse number of which depends upon the individual weight, may be more complicated as the weight becomes larger. In other systems of the prior art, input pulse signals of different weights are counted individually and then the each counted numbers of the input pulses are multiplied by the associated weights to produce a desired information. The system may become tedious since a requested number of multiple pairs of the counter and the multiplier must be increased correspondingly with increase in the number of different weight units.

OBJECTS AND SUMMARY OF THE INVENTION

Accordingly, an object of the present invention is to provide a novel count system for counting and calculating weighted pulse signals. Another object of the present invention is to provide a count system of a high speed operation with circuit elements of small number.

Other objects and further scope of applicability of the present invention will become apparent from the detailed description given hereinafter. It should be understood, however, that the detailed description and specific examples, while indicating preferred embodiments of the invention, are given by way of illustration only, sina various changes and modifications within the spirit and scope of the invention will become apparent to those skilled in the art from this detailed description.

To achieve the above objectives, the count system of the present invention is provided with plural input terminals. Pulse signals of different weights are introduced from different input terminals into the system in a parallel fashion, respectively. Each number of the pulse signals of different weights are counted in a binary code notation. There is also provided a weight information generator which generates weight signals, in a binary coded decimal notation, dependent upon the weight of the weighted pulse signals. Each of the weighted signals is repeatedly added, each number of the repetition being identical with the counted number of the pulse signals of different weights introduced into the system. A desired information may be obtained by totaling the results of these additions.

BRIEF DESCRIPITON OF THE DRAWINGS

The present invention will become more fully understood from the detailed description given hereinbelow and the accompanying drawings which are given by way of illustration only, and thus are not limitative of the present invention and wherein, FIG. 1 is a front view of a card for use in a card totaling system embodying the present invention;

DESCRIPTION OF THE PREFERRED EMBODIMENTS

Referring now in detail to the drawings, and to facilitate a more complete understanding of the present invention, a card for use in a card totaling system embodying the present invention will be first described with reference to FIG. 1.

In this embodiment, an amount of money marked on the card is totaled by the card totaling system employing the present count system. In this example, five different weight units, i.e. 10 Yen, 20 Yen, 30 Yen, 50 Yen and 100 Yen, are provided. When the card is fed into the card totaling system, pulse signals of different weights are introduced from different input terminals into the count system in a parallel fashion. In the illustrated example, each number of the input pulse signals of weights of 10 Yen, 20 Yen, 30 Yen, 50 Yen and 100 Yen are 3, 1, 6, 0 and 4, respectively. The total amount of money is as follows:

$$(10 \text{ Yen} \times 3) + (20 \text{ Yen} \times 1) + (30 \text{ Yen} \times 6) + (100 \text{ Yen} \times 4) = 630 \text{ Yen}$$

The operation for counting the weighted pulse signals and calculating thereof will be described in detail with reference to FIGS. 2 – 4.

Figure 2:
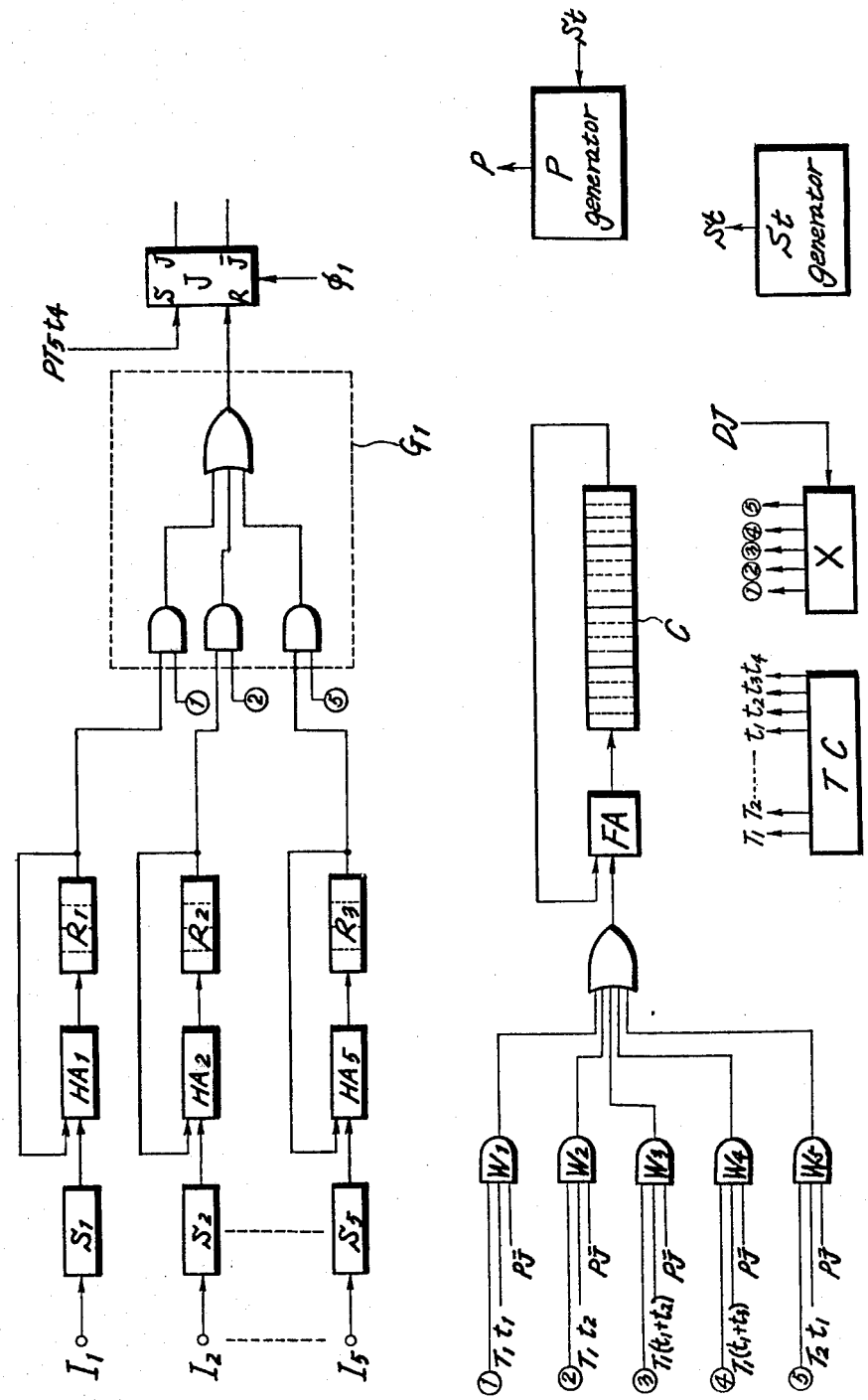
FIG. 2 is a circuit diagram of an embodiment of the present invention.
Figure 3:
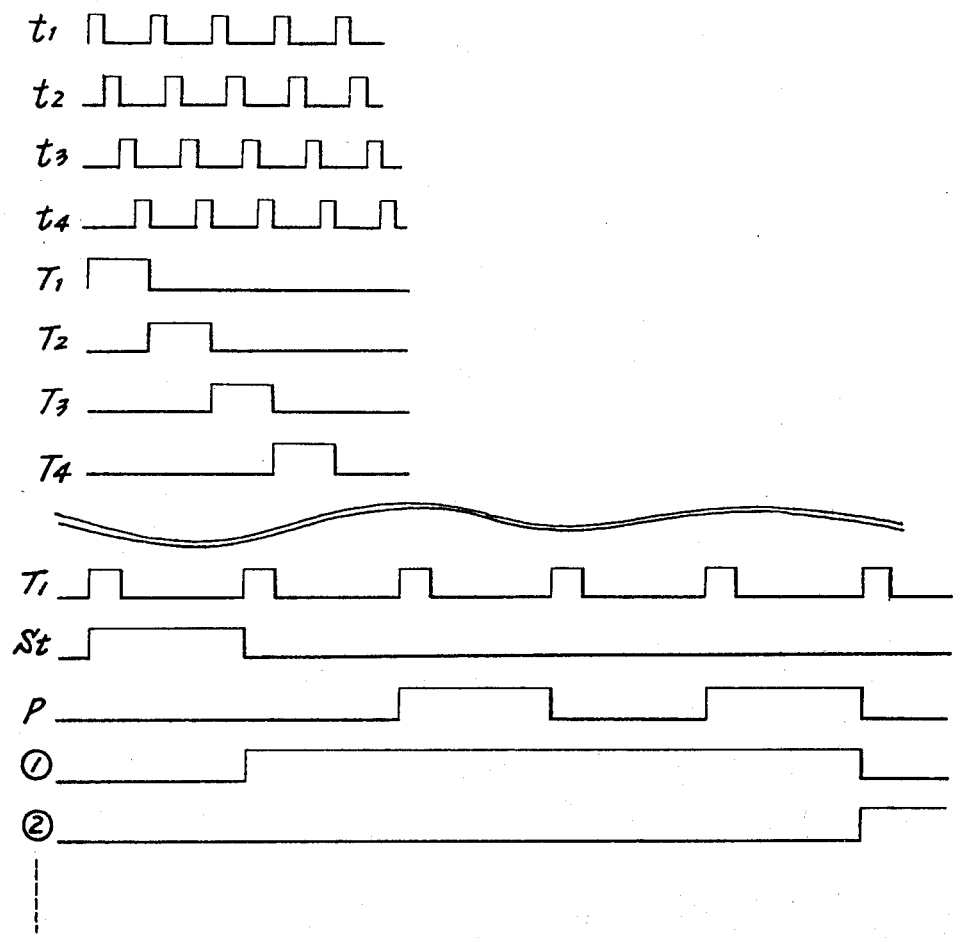
FIG. 3 is a time chart for the purpose of explanation of the operation of the circuit of FIG. 2.

FIG. 2 shows an embodiment of a count system of the present invention. Marks on the card are read out by a known card reader system such as a card reader of an optically reading type. Pulse signals from the card reader system are led to input terminals $I_1, I_2, \ldots I_5$. The input terminal $I_1$ receives the pulse signals of weight of 10 Yen, $I_2$ receives the pulse signals of weight of 20 Yen. Similarly, the input terminals $I_3$, $I_4$, and $I_5$ receive the pulse signals of weights of 30 Yen, 50 Yen and 100 Yen, respectively. Therefore, the pulse signals of different weights are introduced into the count system in a parallel fashion. The input pulse signals are shaped by waveform shaping circuits $S_1, S_2, \ldots S_5$, respectively. The shaping circuits are implemented, for example, by known combinations of flip-flops and gate circuits. Each of the input pulse signals is shaped to have a pulse width of a 4-bit time period. The shaped input pulse signals are led into half-adders $HA_1, HA_2, \ldots, HA_5$, respectively. Each of the half-adders $HA_1, HA_2, \ldots, HA_5$ generate indications to add 1 to the contents of associated registes $R_1, R_2, \ldots R_5$ upon reception of the shaped input pulses. Each of the registers $R_1, R_2, \ldots, R_5$, having capacity of 4 bits and being able to store numbers from 0 to 15, receives the signals from the associated half-adder and stores the number of input pulse signals of corresponding weight in a binary code notation. When the calculation operation is carried out after completion of the introduction of the input pulse signals, a 1 is subtracted from the contents of the registers at every operation cycle, $P \cdot J = 1$, which will be described later. This subtracting operation may also be accomplished by adding 1111 to the contents of the registers. That is, the contents of the registers are reduced by 1 when the associated half-adders $HA_i$ receive signals $P \cdot J \cdot T_1$. An RSS-type (set input priority type) flip-flop J is provided to determine whether the contents of the registers $R_i$ are 0 (zero). The RSS flip-flop J is set at the beginning of periods P for determination, and hence $J = 1$. The RSS flip-flop J is reset at every word time when the contents of the registers $R_i$ are not 0, and hence $P \cdot J = 1$ at the following calculation operation periods P. The RSS flip-flop J is not reset when the contents of the registers $R_i$ become 0, and hence the address of a program control circuit X is advanced at the following calculation operation periods P. Reset signal for the RSS flip-flop J is generated by a logical circuit $G_1$. With the proceeding of the program, micro orders 1, 2, . . . 5 sequentially indicate to introduce the contents of the registers $R_i$ into the RSS flip-flop J through a reset terminal R. These micro orders are sequentially generated from the program control circuit X. The program control circuit X advances the address thereof to the following micro order except the micro orders 1, 2, . . . , 5 when the whole of the contents of the registers $R_i$ are 0 (zero) and hence $J = 1$. A timing counter TC is provided for generating bit time signals $t_1 - t_4$ and digit time signals $T_1 - T_4$ to control operation of the circuit of FIG. 2, the waveform of which are shown in FIG. 3. Calculation start signals St are generated from a calculation start signal generator St. The start signals may be generated when a start button installed on the operation panel of the system is manually depressed, or when the reading-out operation for reading out the marks on the card is accomplished by the card reader system. The calculation operation period P signals and the determination period $\bar{P}$ signals are alternatively generated by a P signal generator P. Each signals P, $\bar{P}$ have pulse widths of one word periods and are generated periodically during period beginning at the generation of the calculation start signals St and ending at the completion of the program of operation. These circuits, such as the timing counter TC, program control circuit X, the calculation start signal generator St and the P signal generator P may be implemented in a known manner.

A weight signal generator W mainly comprises gate circuits $W_1, W_2, W_3, W_4, W_5$. The gate circuit $W_1$ generates weight signals dependent upon the weight of 10 Yen in a binary coded decimal notation. That is, a binary coded decimal notation signal 0001 is introduced into a full-adder FA at a time $T_1 \cdot t$, at the time the gate $W_1$ being opened. Similarly, a gate circuit $W_2$ generates weight signals 0010 dependent upon the weight of 20 Yen at a time $T_1 t_2$, a gate circuit $W_3$ generates 0011, a gate circuit $W_4$ generates 0101 and a gate circuit $W_5$ generates 0001 0000, respectively. These gate circuits $W_1 - W_5$ sequentially operate as the proceeding of the program. These gate circuits $W_1 - W_5$ also receive $P \cdot J$ signals, and therefore, each weight signals are repeatedly introduced into the following full-adder FA till the contents of the registers $R_i$ become 0. Following the full-adder FA, a counter C is provided to add and store the weight signals from the weight signal generator W in a binary coded decimal notation. Each number of the repetition of the adding operation is identical with the counted number of the dependent input pulse signals, or the number stored in the dependent registers $R_i$. The amount of money may be totaled since the program is advanced to the next address for a different weight when $PJ = 1$.

Figure 1:
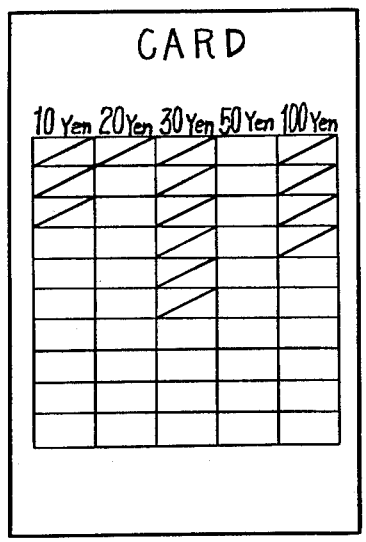

When the card shown in FIG. 1 is read-out and the information marked on the card is introduced into the present system, the number of the pulse signals of different weights are counted and stored by the registers $R_i$ in a binary code notation. The contents of the registers $R_1 - R_5$ become 0011, 0001, 0110, 0000 and 0100, respectively. When the calculation initiates upon generation of St signal, the micro order 1 is indicated at first and the calculation relating to the weight of 10 Yen is carried out. The numeral information from the weight signal generator W, in this case 0001 from the gate circuit $W_1$, is introduced into the counter C and the contents of the counter C is added by the information from the weight signal generator W at every calculation steps. At this time, 1 is subtracted from the contents of the register $R_1$ at every calculation step. The calculation for the weight of 10 Yen may be terminated when the RSS flip-flop J determines that the contents of the register $R_1$ become 0. At the time of the termination of the calculation dependent upon the weight of 10 Yen, the contents of the counter C is 0011 in a binary coded decimal notation, that is 3. Similarly, when the micro order 2 is indicated, the calculation relating to the weight of 20 Yen is carried out and 0011 is added to the contents of the counter C, and hence the contents of the counter C become 0101, that is 5. The program is sequentially carried out and the micro orders 3, 4 and 5 are, progressively indicated. As a result, the contents of the counter C become 0110 0011 in a binary coded decimal notation, or 63. The contents of the counter C are shifted left by one digit in order to obtain the real information, since the weights are of units of 10 Yen in this example. The shift operation may be accomplished by known techniques. In this manner, an desired information, 630 Yen, can be obtained.

Figure 4:
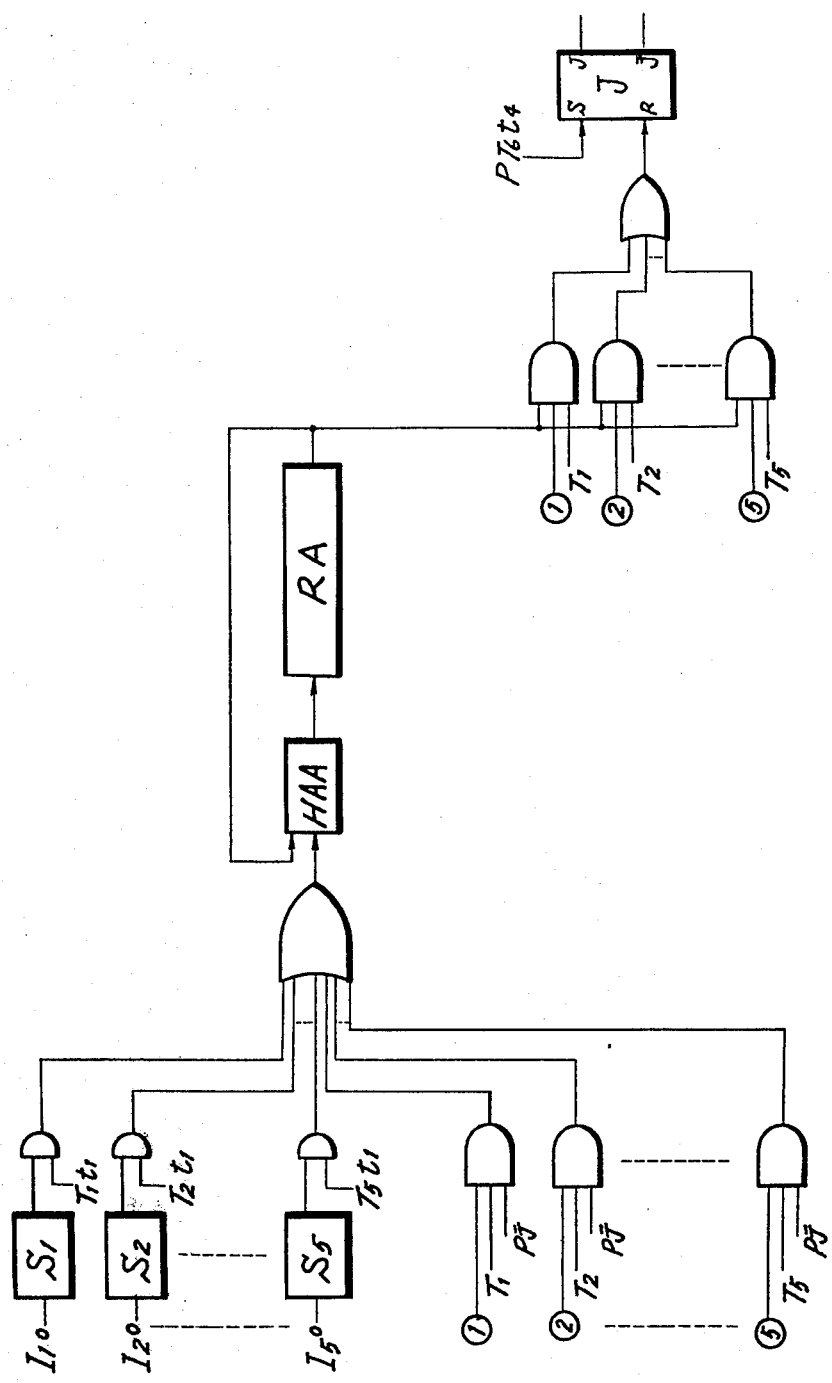
FIG. 4 is a circuit diagram showing another embodiment of the present invention.

FIG. 4 shows another embodiment of the present invention. In this embodiment, each number of the input pulse signals of different weights is counted by a single counter or register $R_A$. The calculating or totaling the amount of money is carried out in the same manner as is shown in FIG. 2, and therefore, only the introduction part of the system is shown in FIG. 4.

There is provided a single counter RA and a single half-adder HAA. Input pulse signals of different weights are introduced into the half-adder HAA through the terminals $I_1, I_2, \ldots I_5$ and the waveform shaping circuits $S_1, S_2, \ldots S_5$. The introduction operation is controlled by the timing signals $T_1, T_2, \ldots T_5$ in a manner to introduce the input pulse signals of weight of 10 Yen at the time period of $T_1$, the signals of weight of 20 Yen at the time period of $T_2$, the signals dependent upon weight of 30 Yen, 50 Yen, 100 Yen at the time period of $T_3, T_4, T_5$, respectively. Information in the counter $R_A$ is introduced into the RSS flip-flop J through logical circuits in order to determine the contents of the counter $R_A$, the logical circuits being also controlled by the timing signals $T_1 - T_5$ which controls the circulation of the counter $R_A$.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In a weighted pulse signal count system including means for scanning a record having areas of different weights and generating pulse signals of different weights corresponding to said respective areas, the improvement comprising:
  plural input terminals for introducing said pulse signals of different weights from different input terminals into the system;

counting means for counting and storing each number of the pulse signals of different weights;

means for generating weight signals dependent upon the weight of the pulse signals of different weights in a binary coded decimal notation, and repeatedly adding the weight signals at different timings, each number of the repetition being identical with the counted number of the pulse signals of different weights.

2. In a weighted pulse signal count system for introducing pulse signals of different weights from a record having areas corresponding to said different weights, counting each number of the pulse signals of different weights and calculating the introduced information, the improvement comprising:

plural input terminals each of which introduces the pulse signals of different weights from said record areas;

plural registers connected to the input terminals each of which counts the number of the pulse signals of different weights;

means for generating weight signals dependent upon the weight of the pulse signals of different weights in a binary coded decimal notation; and means for repeatedly adding the weight signals at different timings, each number of the repetition being identical with the counted number of the pulse signals of different weights introduced into the registers.

3. A weighted pulse signal count system for introducing pulse signals of different weights, counting each number of the pulse signals of different weights and calculating the introduced information, said count system comprising:

plural input terminals each of which introduces the pulse signals of different weights;

plural registers connected to the input terminals each of which counts the number of the pulse signals of different weights;

means for generating weight signals dependent upon the weight of the pulse signals of different weights in a binary coded decimal notation;

means for repeatedly adding the weight signals at different timings, each number of the repetition being identical with the counted number of the pulse signals of different weights introduced into the registers;

plural half-adders each of which is connected between the one of the input terminals and the associated register for adding 1 to the contents of the register when the half-adder receives the input pulse signals and subtracting 1 from the contents of the register when the calculation dependent upon the weight is carried out;

detection means for determining whether the contents of the registers are 0; and counter means for totaling the results of the additions made by the adding means.

4. The count system recited in claim 3, wherein the counter means stores the results of the additions made by the adding means in a binary coded decimal notation.

5. The count system recited in claim 3, wherein the repetition of the addition made by the adding means terminates when the affirmative answer is obtained by the detection means.

6. The count system recited in claim 3, wherein the detection means comprises RSS-type flip-flop the reset terminal of which is connected to receive the output signals from the registers.

* * * * *